United States Patent
Sumiya (10) Patent No.: US 10,139,664 B2
(45) Date of Patent: Nov. 27, 2018

(54) PREVENTING COLOR MIXING IN LIQUID CRYSTAL DISPLAY DEVICES

(71) Applicant: Panasonic Liquid Crystal Display Co., Ltd., Hyogo (JP)

(72) Inventor: Naotoshi Sumiya, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 14/747,799

(22) Filed: Jun. 23, 2015

(65) Prior Publication Data

US 2016/0377912 A1    Dec. 29, 2016

(51) Int. Cl.
*G02F 1/1335* (2006.01)
*G02F 1/1362* (2006.01)

(52) U.S. Cl.
CPC .. *G02F 1/133512* (2013.01); *G02F 1/136286* (2013.01)

(58) Field of Classification Search
CPC combination set(s) only.
See application file for complete search history.

(56) References Cited

U.S. PATENT DOCUMENTS

2012/0327340 A1* 12/2012 Ochiai ............. G02F 1/133512
349/108

* cited by examiner

*Primary Examiner* — Lauren Nguyen
(74) *Attorney, Agent, or Firm* — McDermott Will & Emery LLP

(57) ABSTRACT

An LCD panel includes a display having a right edge, a left edge, and a center line. The display includes first substrate comprising a set of data lines extending in first direction and aligned in second direction, each of the data lines having a center. The display further includes second substrate aligned with the first substrate comprising a light blocking film overlapping the set of data lines and having a set of light blocking portions extending in the first direction and aligned in the second direction, each of the light blocking portions having a center and overlapping with an associated one of the data lines. The display has a liquid crystal layer interposed between the first substrate and the second substrate and relative distance between the center of a data line and the center of an associated light blocking portion is determined based on a location of the data line.

15 Claims, 11 Drawing Sheets

PREVENTING COLOR MIXING IN LIQUID CRYSTAL DISPLAY DEVICES

TECHNICAL FIELD

The present disclosure relates to a liquid crystal display (LCD) device including a Thin Film Transistor (TFT) substrate having a plurality of TFTs and signal lines and a counter substrate having a plurality of color filters divided by light blocking portions or black matrices (BM), such that each light blocking portion blocks light from a backlight from passing through the color filter.

BACKGROUND

A liquid crystal display (LCD) device is one example of display devices that are used as high-definition color monitors for computers and other information devices, and as television receivers. An LCD device fundamentally includes a display portion in which liquid crystals are sandwiched between two substrates. The two substrates are arranged to face each other in an opposed manner with liquid crystal sandwiched therebetween. The two substrates include a Thin Film Transistor (TFT) substrate and a counter substrate or a color filter substrate which is arranged to face the TFT substrate in an opposed manner with the liquid crystal sandwiched therebetween. The TFT substrate comprises several elements including TFTs, pixel electrodes, gate lines and data lines. The gate lines are arranged parallel to each other and data lines are arranged perpendicular to the gate lines. Each data line is electrically connected with one end of a semiconductor layer. A connection portion of the data line which is connected with the semiconductor layer functions as a drain electrode of the TFT.

The counter substrate which is arranged to face the TFT substrate with the liquid crystal sandwiched therebetween also comprises several elements. The counter substrate includes light blocking films or black matrices (BMs). The black matrices are formed so as to overlap the data lines which are formed on the TFT substrate. The black matrices are arranged parallel to each other. Further, color sub pixels or color filters are provided in such a manner that each color filter is formed between the neighboring black matrices. These color filters can be arranged in order of a green color filter (G), a red color filter (R), a blue color filter (B), a green color filter (G), a red color filter (R), . . . , for example. Regions which are covered with the red color filters (R) constitute red sub pixels, regions which are covered with the blue color filters (B) constitute blue sub pixels, and regions which are covered with the green color filters (G) constitute green sub pixels, and these sub pixels are arranged adjacent to each other. These three sub pixels having different colors constitute a unit pixel for the color display.

In the LCD device having the above-mentioned constitution, when the display screen is viewed from an oblique angle, there arises a problem referred to as color mixing. Color mixing occurs when a color of a sub pixel in the OFF state which is arranged adjacent to a sub pixel in the ON state, appears to be mixed with color of the sub pixel in the ON state. This issue usually arises for sub pixels located close to a side edge of the display screen and are viewed from an oblique angle close to the opposite side edge of the display. This is because a light from a backlight may pass through the sub pixel in the OFF state and reach the viewer who is looking at the display from an opposite corner on an oblique angle.

SUMMARY

To address the above problem, an object of the present disclosure is to provide an LCD in which color mixing is suppressed when the LCD is viewed from an oblique angle.

An LCD device is provided, which includes a display portion having a right edge and a left edge. The display portion is divided into a right side and a left side by a center line. The display portion includes a first substrate comprising a set of data lines extending in a first direction and aligned in a second direction intersecting the first direction, each of the set of data lines having a center along the first direction. The display portion also includes a second substrate aligned with the first substrate comprising a light blocking film overlapping the set of data lines and having a set of light blocking portions extending in the first direction and aligned in the second direction, each of the set of light blocking portions having a center along the first direction, each of the set of light blocking portions overlapping with an associated one of the set of data lines in a planar view. The display portion also includes a liquid crystal layer interposed between the first substrate and the second substrate. A relative distance between the center of a data line and the center of an associated light blocking portion is determined based on a location of the data line.

In another embodiment, the LCD device includes a display portion having a right edge and a left edge. The display portion is divided into a right side and a left side by a center line. The display portion includes a first substrate comprising a set of data lines extending in a first direction and aligned in a second direction intersecting the first direction, each of the set of data lines having a center along the first direction. The display portion also includes a second substrate aligned with the first substrate comprising a light blocking film overlapping the set of data lines and having a set of light blocking portions extending in the first direction and aligned in the second direction, each of the set of light blocking portions having a center along the first direction, each of the set of light blocking portions overlapping with an associated one of the set of data lines in a planar view. The display portion also includes a liquid crystal layer interposed between the first substrate and the second substrate. A width of a light blocking portion associated with a data line is determined based on a location of the data line.

In another embodiment, the LCD device includes a display portion having a right edge and a left edge, the display portion being divided into a right side and a left side by a center line. The display portion includes a first substrate comprising a set of data lines extending in a first direction and aligned in a second direction intersecting the first direction. The display portion also includes a second substrate aligned with the first substrate comprising a color filter having a set of color filter portions, such that a color filter portion from the set of color filter portions is surrounded by a set of light blocking portions overlapping the set of data lines and the color filter portion is associated with at least one light blocking portion and with at least one data line. The display portion also includes a liquid crystal layer interposed between the first substrate and the second substrate. A width of a color filter portion associated with a data line is determined based on a location of the data line.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1A:
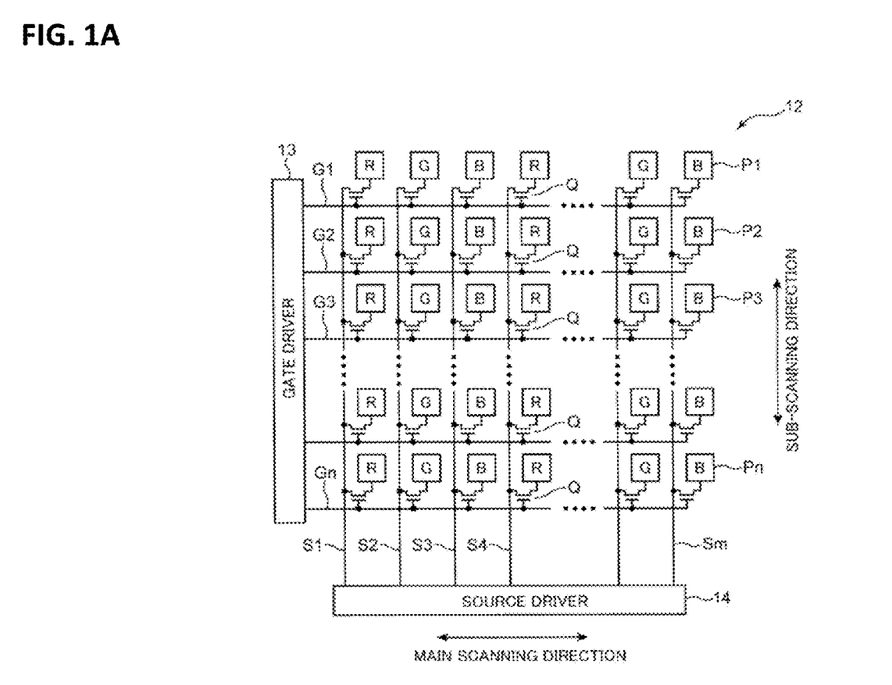
FIGS. 1A-1D are exemplary diagrams of substrates of a liquid crystal display.

FIGS. 1A-1D are exemplary diagrams of substrates of an LCD device. FIG. 1A is a circuit diagram showing a connection state of signal lines of an LCD panel 12. The source signal (data signal) lines S1, S2, . . . , Sm extend from a source driver 14 in a vertical direction (sub scanning direction), and are aligned in a horizontal direction (main scanning direction). The gate lines G1, G2, . . . , Gn extend in the horizontal direction (the main scanning direction) from a gate driver 13, and are aligned in the vertical direction (the sub scanning direction). The thin film transistors Q and the pixel electrodes P1, P2, . . . , Pn (134 in FIG. 1C) for red (R), green (G) and blue (B) colors are disposed in a matrix at intersection points of the signal lines S1, S2, . . . , Sm, and the gate lines G1, G2, . . . , Gn.

Figure 1B:
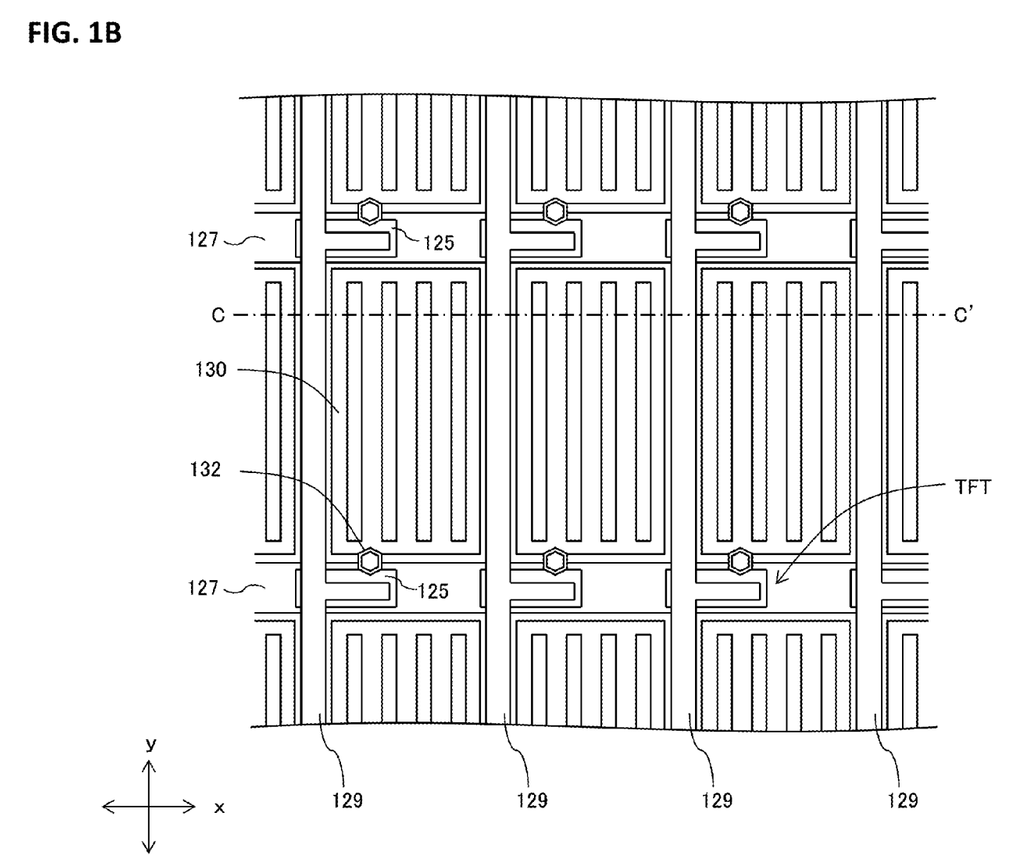
Figure 1C:
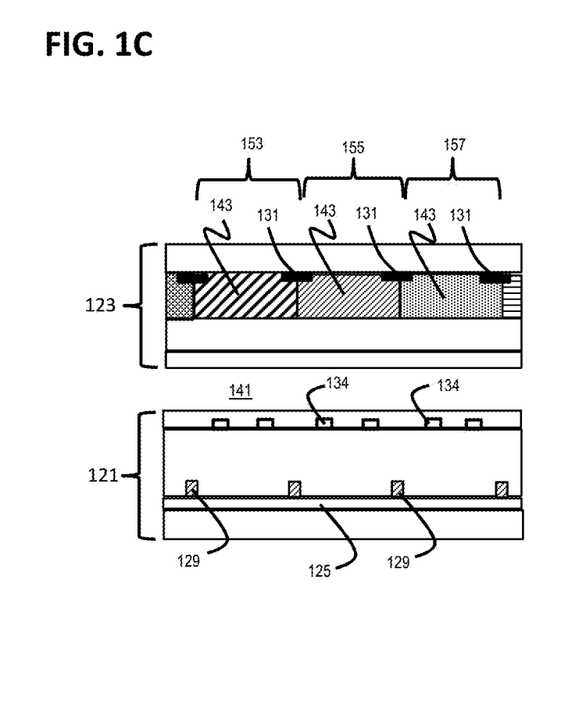

FIG. 1B is a plan view showing an LCD panel. FIG. 1C is a cross-sectional view of the LCD panel of FIG. 1B taken along a line C-C' in FIG. 1B. The liquid crystal panel of FIGS. 1B and 1C comprises a pair of substrates which are arranged to face each other in an opposed manner with liquid crystal sandwiched therebetween. A TFT substrate 121 (including TFTs similar to TFT 213 of FIG. 2B) and a color filter substrate 123 (including color filters similar to color filter 211 of FIG. 2B) are arranged to face each other with the liquid crystal 141 sandwiched therebetween. A semiconductor layer 125 made of poly-silicon (p-Si), for example, is formed in a region of an upper surface of a transparent substrate of the TFT substrate 121 where a TFT is formed for every pixel region 135, and an insulation film is formed so as to cover the semiconductor layer 125. On an upper surface of the insulation film, the gate signal lines 127 are formed such that the gate signal lines 127 extend in the x direction (the main scanning direction) and are arranged parallel to each other in the y direction (the sub scanning direction) as shown in FIG. 1B. Here, the gate signal line 127 is connected to a gate electrode of the TFT at an intersecting portion. Further, on an upper surface of the insulation film, the data lines 129 are formed in a state that the data lines 129 extend in the y direction and are arranged parallel to each other in the x direction as shown in FIG. 1B. The data line 129 is electrically connected with one end of the semiconductor layer 125. A connection portion of the data line 129 which is connected with the semiconductor layer 125 functions as a drain electrode of the TFT. The TFT and a pixel electrode 134 are connected through a contact hole 132.

The color filter substrate 123, which is arranged to face the above-mentioned TFT substrate 121 with the liquid crystal 141 sandwiched therebetween, includes a transparent substrate made of glass, for example. Black matrices (light blocking films) 131 are formed on a liquid crystal side surface of the color filter substrate 123. The black matrices 131 are formed so as to overlap the data lines 129 in a planar view (viewed along the normal direction of the LCD panel) which are formed on the TFT substrate 121. Color filters (143 in FIG. 1C) are provided in such a manner that each color filter is formed between the neighboring black matrixes 131 in a planar view. In other words, black matrices 131 are formed along boundaries between color filters 143. These color filters are arranged in the x direction in FIG. 1B in order of the green color filter (G), the red color filter (R), the blue color filter (B), the green color filter (G), the red color filter (R), . . . , for example. Regions which are covered with the respective color filters form sub pixels 135, and these sub pixels are arranged adjacent to each other in the x direction in FIG. 1B. A set of three sub pixels 135 having three different colors green, red and blue form a unit pixel for the color display.

Figure 1D:
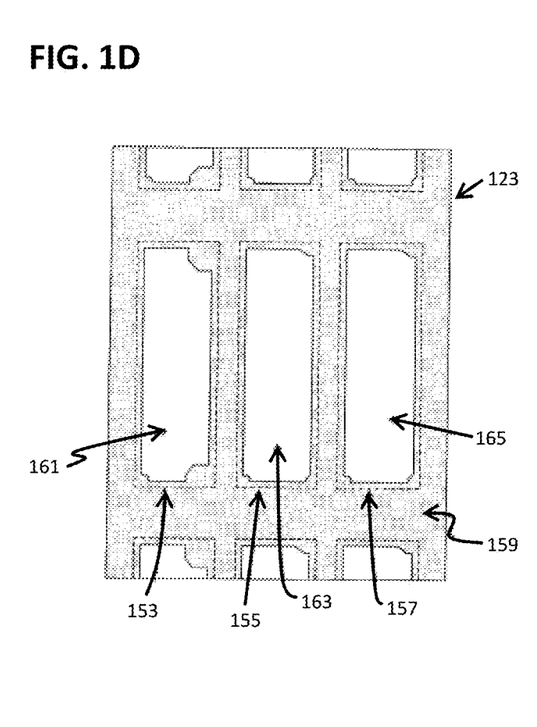

FIG. 1D is a configuration of black matrices and color filters on the color filter substrate 123 of an LCD panel. The area 153 denotes a field in which a red color filter is formed, 155 denotes a field in which a green color filter is formed, and 157 denotes a field in which a blue color filter is formed (similar to color filter portion 429 of FIG. 4). 161 denotes a field within a red pixel zone through which light passes, 163 denotes a field within a green pixel zone through which light passes, and 165 denotes a field within a blue pixel zone through which light passes. Area 159 denotes a light blocking film creating black matrices (similar to black matrices 411 of FIG. 4). The light blocking film 159 has openings aligned with respective fields (sub pixels) 153, 155 and 157. The edges of the black matrices and the edges of the color filters are superimposed on one another.

Figure 2A:
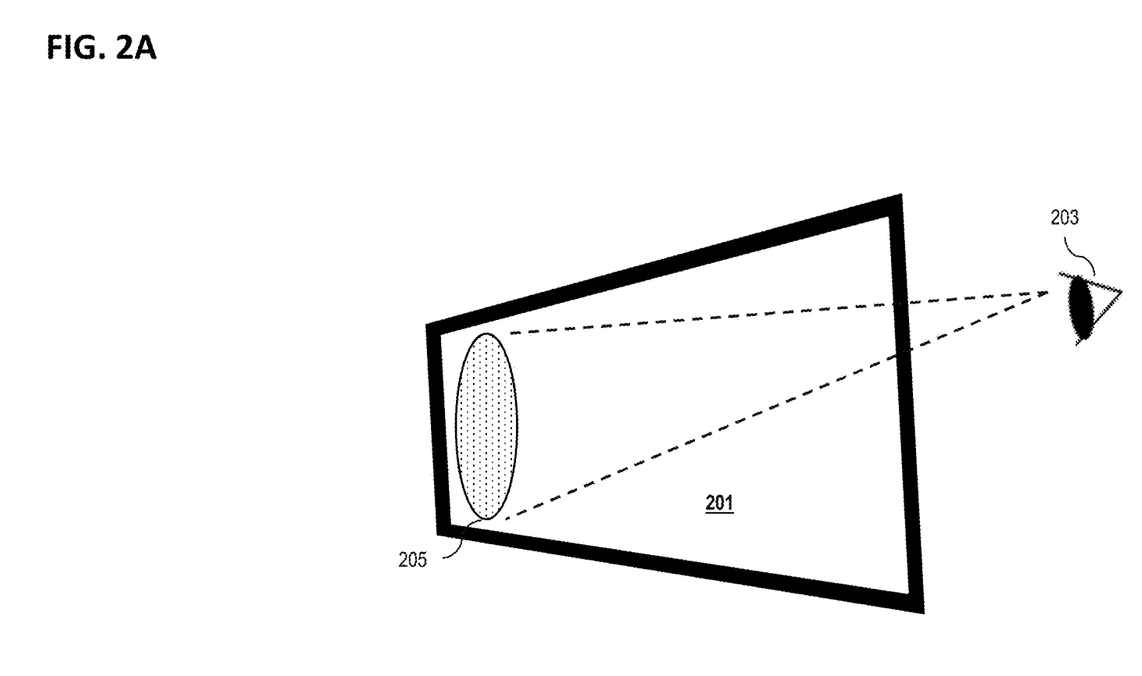
FIGS. 2A-2B are exemplary diagrams showing color mixing in a liquid crystal display.
Figure 2B:
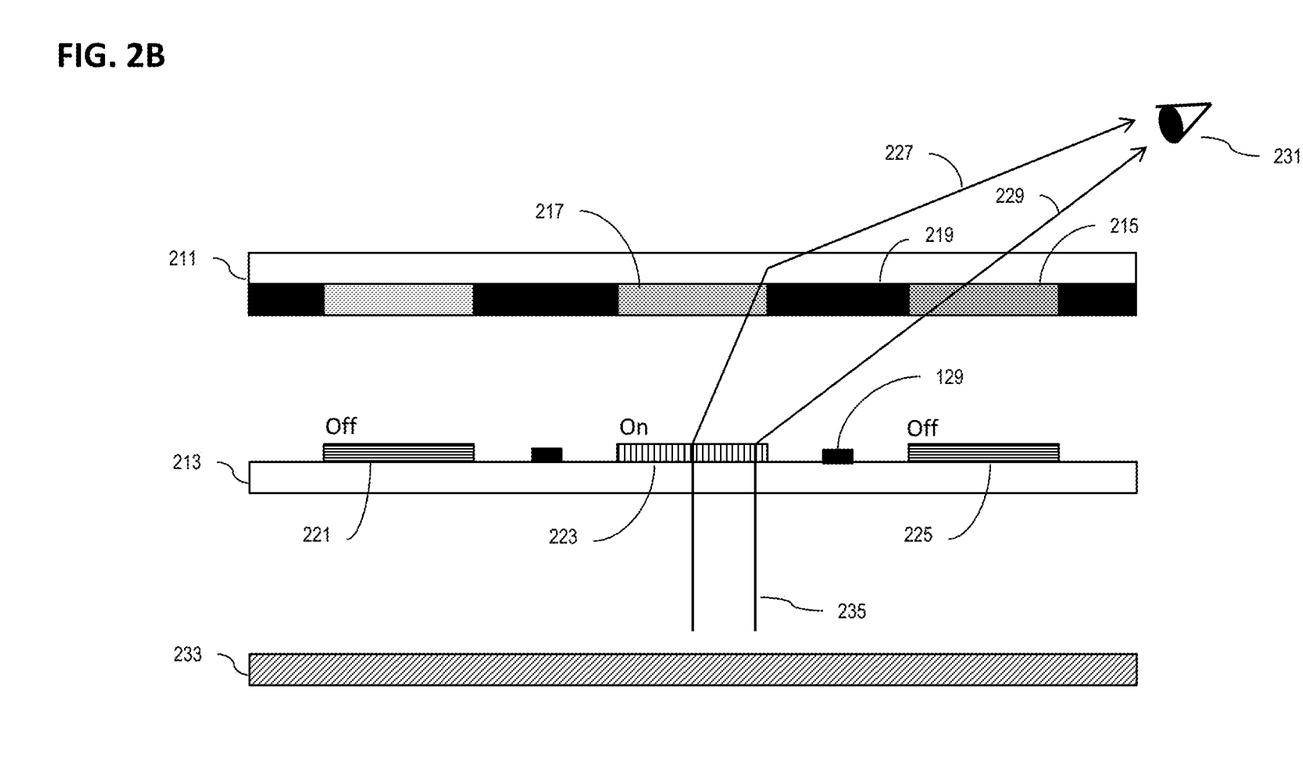

FIGS. 2A-2B are exemplary diagrams showing color mixing in an LCD device. For example, when the display screen 201 of FIG. 2A is viewed from location 203 with an oblique direction as shown in FIG. 2A, the color mixing may occur in area 205 of the display screen 201 opposite from the view point 203. FIG. 2B shows an exemplary diagram of how the color mixing occurs. As shown in FIG. 2B, the display 201 includes two substrates, the color filter substrate 211 and the TFT substrate 213. In the color filter substrate 211, the blue sub pixel 215 is arranged adjacent to the red sub pixel 217 separated by a black matrix 219. The TFT substrate 213 includes light switching elements 221, 223 and 225 (a combination of a TFT, electrodes and liquid crystal). In the example of FIG. 2B, the light switching elements 221 and 225 are in an OFF state so that a light from a backlight 233 is blocked, while the light switching element 223 is in an ON state so that the light can pass through to the color filter substrate 211. The light 235 from the backlight 233 illuminates the red sub pixel 217 and a viewer can see the red light through the red sub pixel 217. However, for a viewer viewing the screen from location 231, the light from backlight 233 can pass through the blue sub pixel 215 and be seen through the red sub pixels 217 and the blue sub pixel 215 along lines 227 and 229, respectively. As a result the viewer 231 can see a mixture of red light through the red sub pixel 217 and blue light through the light illuminating blue sub pixel 215 along line 229. Accordingly, a need exists to block light to which blue is mixed using the black matrix arranged between the red sub pixel 217 and the blue sub pixel 215.

Figure 3A:
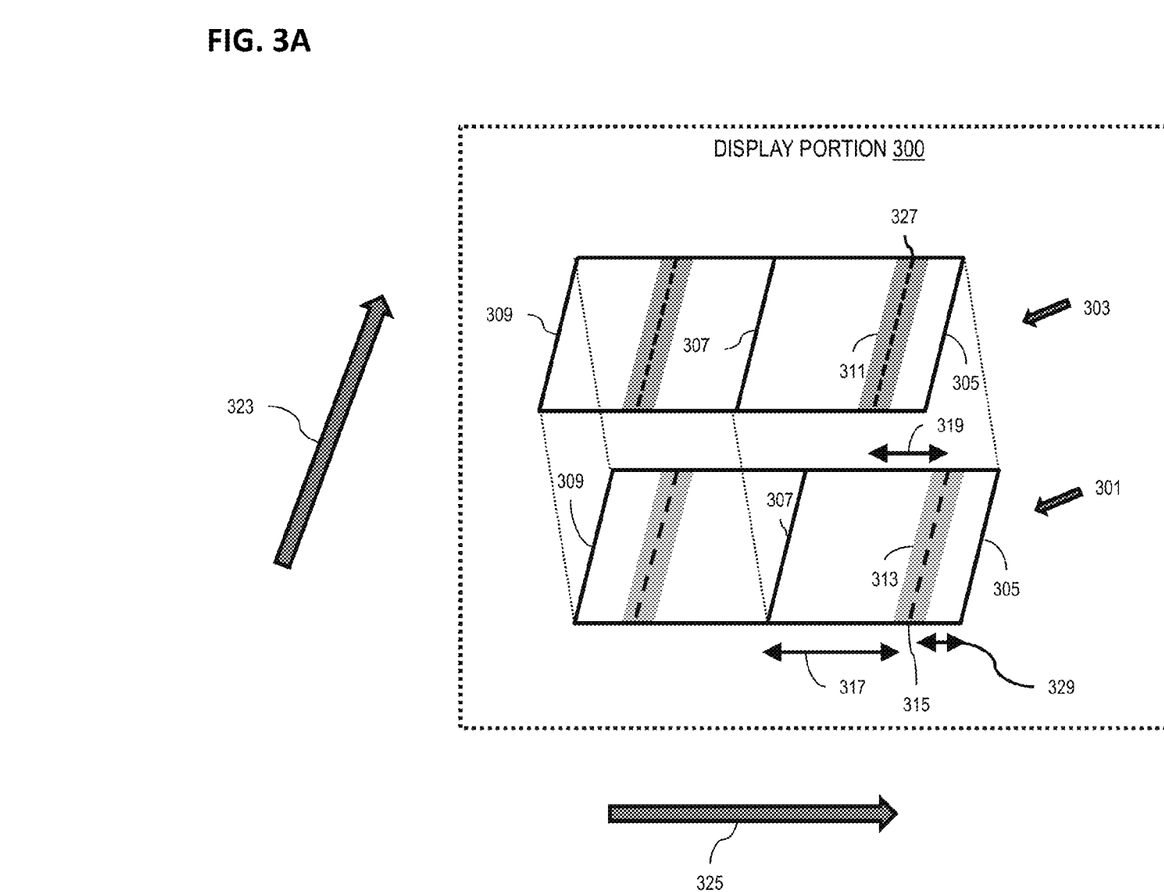
FIGS. 3A-3C are exemplary diagrams of a liquid crystal display, according to one embodiment of the present disclosure.
Figure 3B:
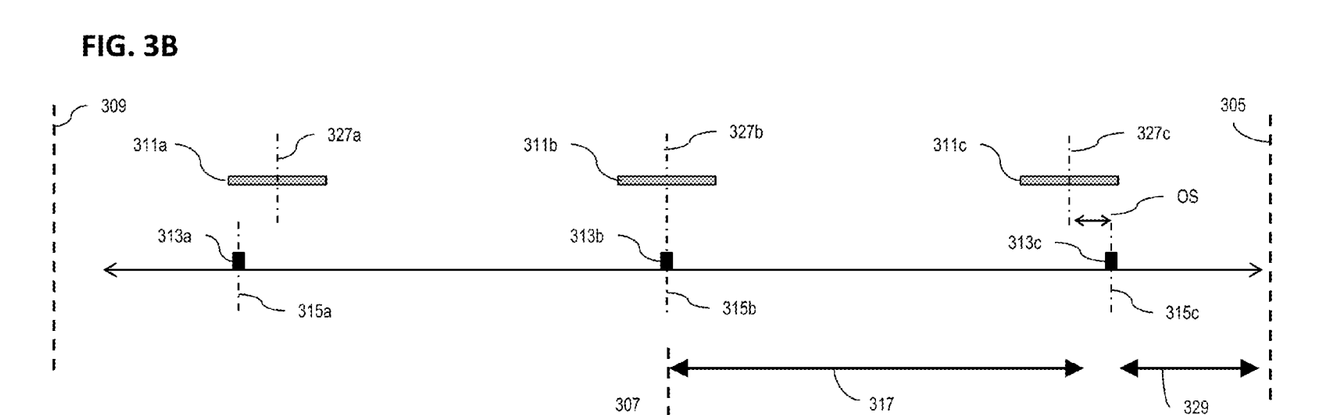
Figure 3C:
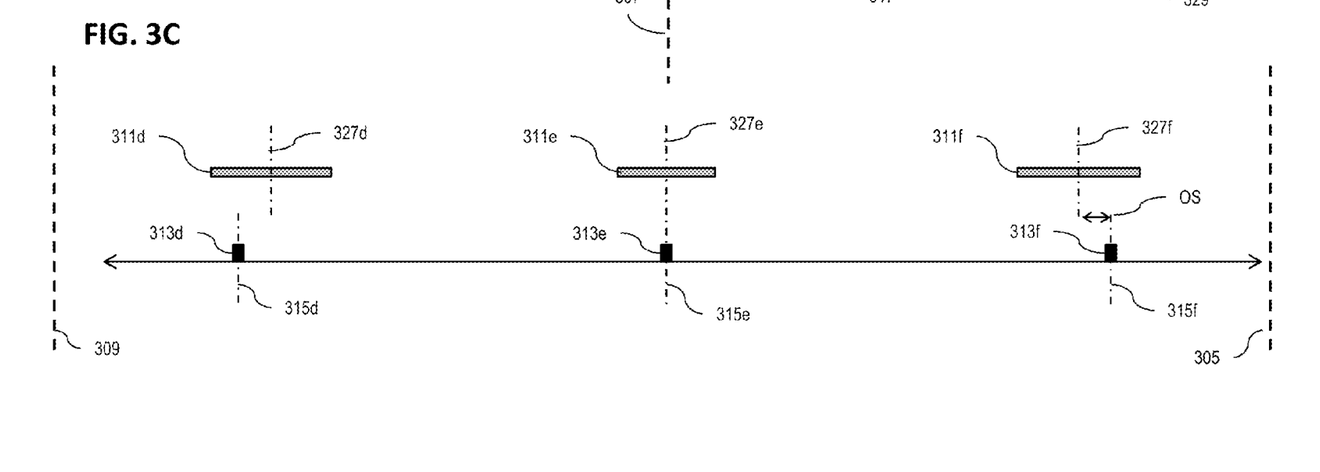

FIGS. 3A-3C are exemplary diagrams of a liquid crystal display, according to one embodiment of the present disclosure. FIG. 3A is an exemplary diagram of a display portion 300. The display portion 300 of FIG. 3 includes a first substrate (TFT substrate) 301 and a second substrate (color filter substrate) 303. The first substrate 301 and the second substrate 303 are aligned on each other with the liquid crystal sandwiched therebetween (not shown). The display portion 300 has a right edge 305, a left edge 309 and the display portion 300 can be virtually divided into a right side and a left side by a center line 307. The center line 307 is a virtual line considered for clarifying the description of the present disclosure.

The first substrate 301 includes a set of data lines 313 extended in a first direction 323 and aligned in a second direction 325 that intersects with the first direction 323. For each data line 313, a center 315 may be considered along the first direction 323. The second substrate 303 is aligned with the first substrate 301 and includes a light blocking film that overlaps the set of data lines 313 and has a set of light blocking portions or black matrices 311. The black matrices 311 extend in the first direction 323 and align in the second direction 325. For each black matrix 311, a center 327 may be considered along the first direction 323. The centers 315 and 327 are virtual lines considered for clarifying the description of the present disclosure.

Moreover, each black matrix 311 overlaps with a data line 313 from the set of data lines of the first substrate 301. For each data line 313 from the first substrate 301, there is an associated black matrix 311 of the second substrate 303, such that the data line 313 overlaps with the associated black matrix 311. In other words, the data lines 313 are disposed on regions that are covered by black matrices 311, respectively, so that the data lines 313 are not visible.

FIG. 3B illustrates a first embodiment of the present disclosure. As shown in FIG. 3B, if the data line 313 is located at or close to the center line 307 (pixels at or closer to the center line 307), such as data line 313b in FIG. 3B, the center 327b of the black matrix 311b associated with the data line 313b and the center 315b of the data line 313b are aligned with each other such that the distance OS between the center 327b of the black matrix 311b associated with the data line 313b and the center 315b of the data line 313b (in a planar view) is smaller than a predefined value. The predefined value can be set to a negligible value (e.g., 1% to 5% of the width of the black matrix 311b or 1% to 5% of the width of the data line 313b) such that the black matrix 311b and the data line 313b can be considered as overlapping with each other. In one embodiment of the present disclosure, OS equals zero (0).

When data lines are located away from the center line 307 (for example, data lines 313a and 313c) toward the left edge 309 or the right edge 305 of the LCD panel, the associated black matrices (311a and 311c) are shifted toward the center line 307 as shown in FIG. 1B. Thus, the distance OS between the center 315a of data line 313a and center 315c of data line 313c and the centers 327a and 327c of the associated black matrices 311a and 311c are set larger than the OS for the pixels at or around the center line 307, i.e., set larger than the predefined value, shown in FIG. 3B as OS.

According to the first embodiment discussed above, in order to prevent the color mixing on sides of the display portion 300, the black matrices 311a and 311c for the pixels located away from the center line 307 of the LCD panel are shifted inwardly towards the center line 307. The shifting can block the light from a backlight to reach the viewer with an oblique view and can prevent the color mixing effect from occurring. In the first embodiment, the width of the back matrix is the same and only the location of the black matrix (relative location with respect to the associated data line) changes.

FIG. 3C shows a second embodiment of the present disclosure. In the second embodiment, the width of black matrix changes. As shown in FIG. 3C, if the data line 313 is located at or close to the center line 307 (pixels at or closer to the center line 307), such as data line 313e in FIG. 3C, the center 327e of the black matrix 311e associated with the data line 313e and the center 315e of the data line 313e are aligned with each other such that the distance OS between the center 327e of the black matrix 311e associated with the data line 313e and the center 315e of the data line 313e (in a planar view) is smaller than a predefined value. As previously discussed, the predefined value can be set to a negligible value (e.g., 1% to 5% of the width of the black matrix 311e or 1% to 5% of the width of the data line 313e) such that the black matrix 311e and the data line 313e can be considered as overlapping with each other. In one embodiment of the present disclosure, OS equals zero (0).

In the second embodiment, when data lines are located away from the center line 307 (for example, data lines 313d and 313f), the associated black matrices (311d with center 327d associated with data line 313d with center 315d and 311f with center 327f associated with data line 313f with center 315f) have larger width than a width of the black matrix 311e for the center pixels. The width can be increased by increasing only a side closer to the center line 307 of the black matrix, or by increasing both sides of the black matrix evenly or asymmetrically. The width of the black matrix 311d or 311f close to the left edge 309 and the right edge 305 may be about 10% to about 40% larger than the width of the black matrix 311e at the center.

According to the second embodiment discussed above, in order to prevent the color mixing on sides of the display portion 300, the black matrices 311d and 311f of the pixels located away from the center line 307 are wider than the black matrices 311e for the pixels located at or closer to the center line 307. The increased width of the black matrices can block the light from a backlight to reach the viewer with an oblique view and can prevent the color mixing effect from occurring.

In addition to increasing the width of the black matrices on the sides of the display portion 300, the black matrices on the sides can also be shifted inwards towards the center line 307, as previously discussed with regard to the first embodiment. For example the black matrices 311d and 311f can be shifted inward towards the center line 307. The increased width of the black matrices and shifting can block the light from a backlight to reach the viewer with an oblique view and can prevent the color mixing effect from occurring.

In some instances, the relative location of the black matrix to the associated data line and/or the width of the black matrix for the pixels are different from those for the pixels at or closer to the center line 307, when the pixels are located within the edge distance 329 from the right edge 305 or the left edge 307. When the pixels are located within a center distance 317, the relative location and/or the width of the black matrices is/are the same as those for the pixel at the center line 307.

In the second embodiment, the width of the black matrix is adjusted according to the location of the pixels in which the black matrix exists. The same or similar effect can be obtained by adjusting the width of color filters in the sub pixels.

In a third embodiment, the width of sub pixel 215 can be adjusted such that the black matrices 219 surrounding the sub pixel 215 can block the light from a backlight 233 from reaching the viewer. In this embodiment, for each side data line 313 for the pixels located within a predefined edge distance 329 from the right edge or from the left edge, the width of a sub pixel associated with the data line can be smaller than the width of a sub pixel associated with a center data line for pixels at or near the center line 307. For example, the predefined edge distance can be set to 50% or 45% of the distance between an edge 305 and the center line 307.

According to the third embodiment discussed above, in order to prevent the color mixing on sides of the display portion 300, the sub pixels located within a predefined edge distance from the right edge 305 or from the left edge 309 are narrower than the sub pixels located within a predefined center distance from the center line 307. The predefined center distance can be determined based on the predefined edge distance. For example, if the predefined edge distance is set to 45% of the distance between the edge 305 and the center line 307, the center distance can be set to 55% of the distance between the edge 305 and the center line 307, such that the sum of the edge distance and the center distance equals the total distance between the edge line 305 and the center line 307. The decreased width of the sub pixels on two sides of the display portion 300 can block the light from a backlight to reach the viewer with an oblique view and can prevent the color mixing effect from occurring. In some instances, in addition to decreasing the width of the sub pixels on the sides of the display portion 300, the black matrices 311 on the sides can also be shifted inwards towards the center line 307, as previously discussed with regard to the first embodiment. For example the black matrices 311 parallel to the center line 307 and located within a predefined edge distance (as discussed above) from the right edge 305 or from the left edge 309 can be shifted inward towards the center line 307. The decreased width of the sub pixels and shifting of the black matrices parallel to the center line 307 can block the light from a backlight to reach the viewer with an oblique view and can prevent the color mixing effect from occurring.

Figure 4:
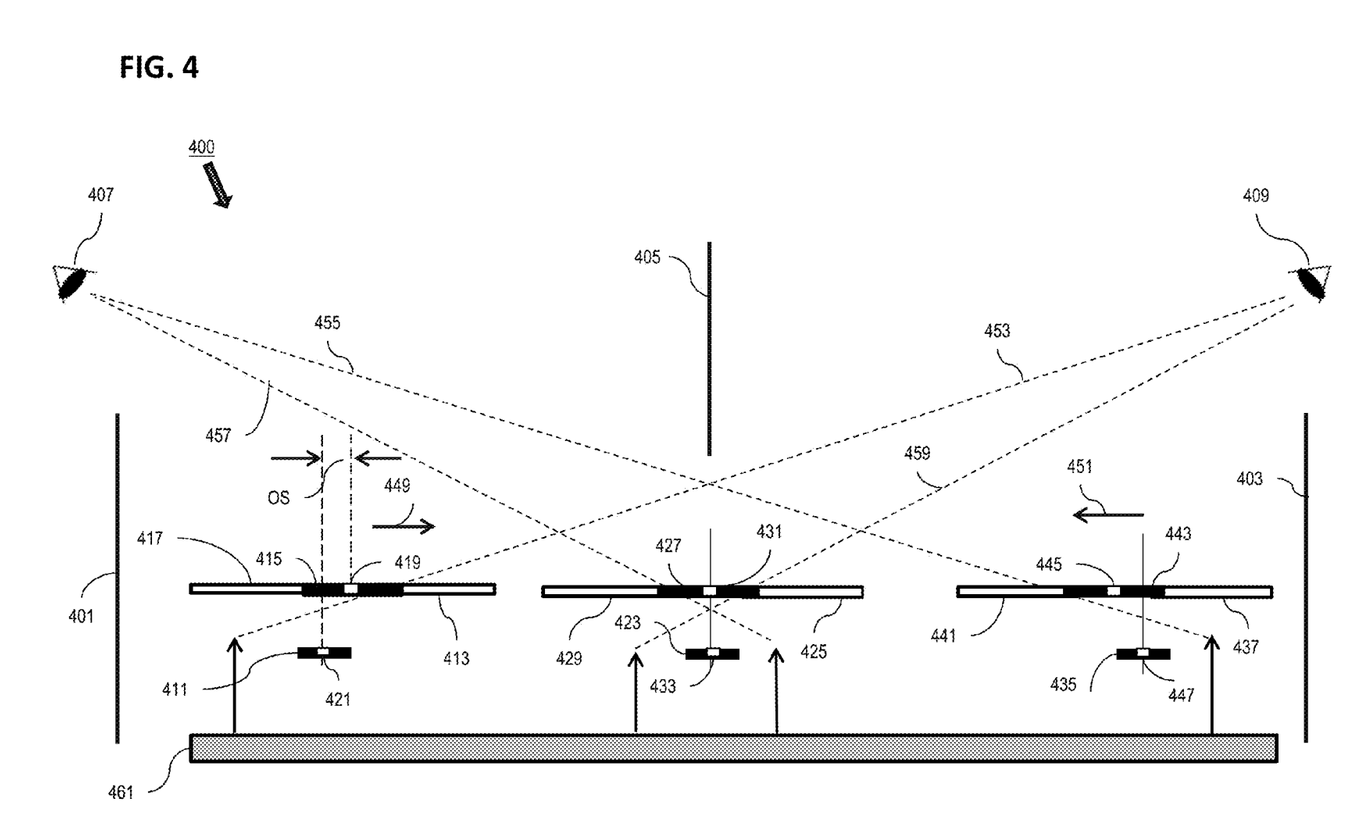
FIG. 4 is an exemplary diagram of an LCD with black matrices being shifted on sides of the LCD, according to one embodiment of the present disclosure.

FIG. 4 illustrates more details of the first embodiment shown by FIG. 3B. FIG. 4 shows an LCD 400 with a left edge 401 and a right edge 403 and is virtually divided into a left region and a right region by a center line 405 (a virtual line). A viewer 407 located in the left corner close to left edge 401 is looking at the right side of the LCD near the right edge 403. Similarly, a viewer 409 located in the right corner close to right edge 403 is looking at the left side of the LCD near the left edge 401.

If a relative position of center 419 of the black matrix 415 (located between sub pixels 417 and 413) and center 421 of data line 411 in the left side was equal to a relative position of center 431 of the black matrix 427 (located between sub pixels 429 and 425) and center 433 of data line 423 at the center of the LCD 400, the color mixing would occur for the viewer 409, similar to FIG. 2B. Similarly, if a relative position of center 445 of the black matrix 443 (located between sub pixels 441 and 437) and center 447 of data line 435 in the right side was equal to the relative position of center 433 of data line 423 and center 431 of black matrix 427 at the center of the LCD 400, the color mixing would occur for the viewer 407, similar to FIG. 2B.

In such circumstances, the color mixing may occur for either of the viewers 407 and 409. For example, a light from a backlight 461 corresponding with data line 411 may reach the viewer 409 through sub pixel 413 and path 453. Similarly, viewer 407 may see light from a backlight 461 corresponding with data line 435 through sub pixel 441 and through path 455.

In order to prevent the color mixing from occurring, as previously discussed, the black matrix 415 in the region closer to the left side is arranged to be shifted inwardly towards the center line 405 of the LCD 400 (shown by an arrow 449). As shown in FIG. 4, the black matrix 415 is shifted toward the center line 405 with an offset OS relative to the data line 411. Similarly, black matrix 443 is also arranged to be shifted inwardly towards the center line 405 (shown by an arrow 451). The shifting of the black matrices can block the viewing paths 453 and 455 and prevent light from backlight 461 corresponding with data lines 411, 433 and 435, to reach viewers 407 and 409 located at the edges of the LCD 400 opposite to each data line. It is noted that the black matrix 427 for the center pixel can block light paths 459 and 457 for the viewers 409 and 407, respectively.

Figure 5:
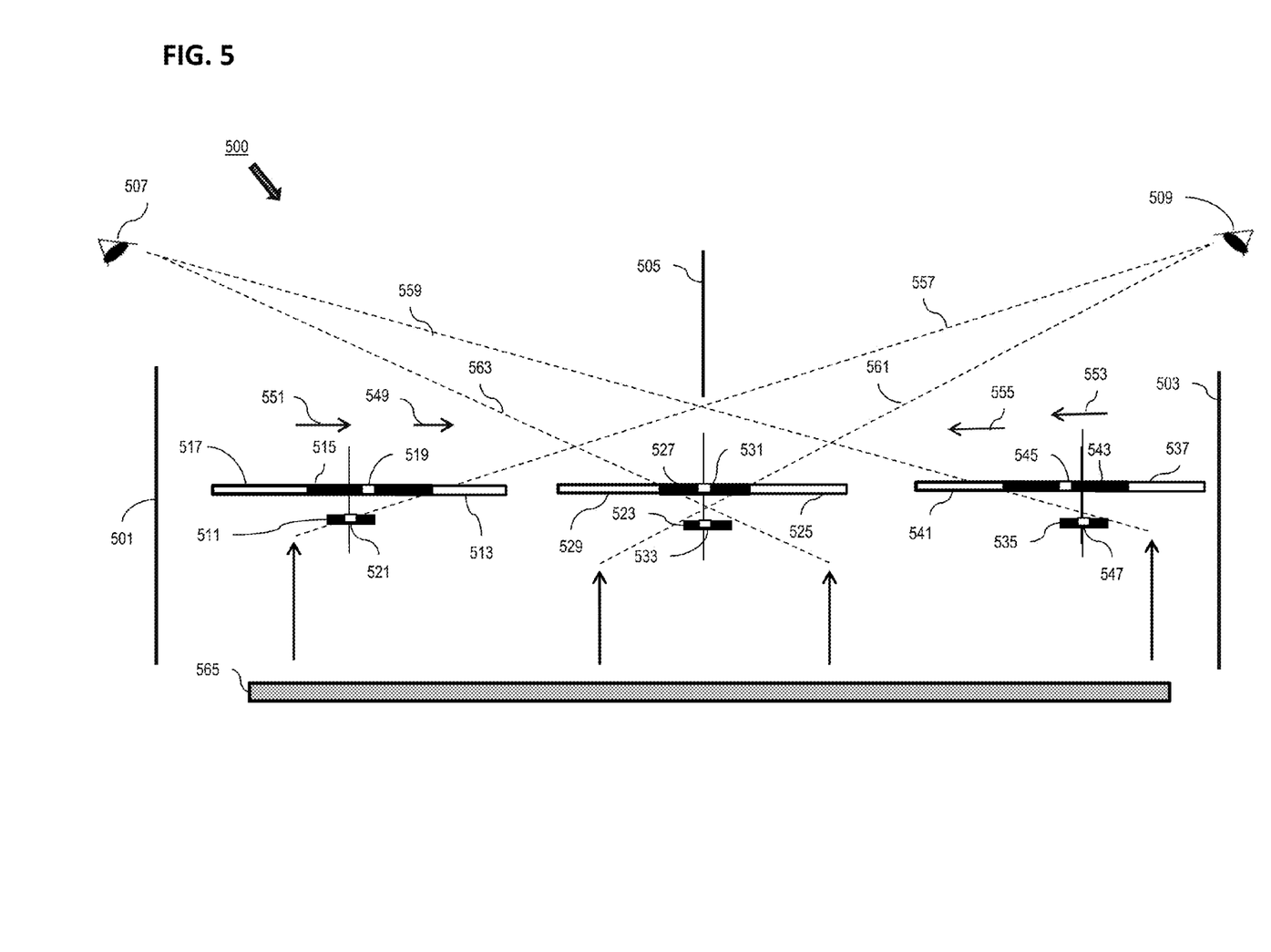
FIG. 5 is an exemplary diagram of an LCD with Black matrices having increased width or color filters having decreased width on sides of the LCD, according to another embodiment of the present disclosure.

FIG. 5 illustrates more details of the second embodiment shown by FIG. 3C. FIG. 5 shows an LCD 500 with a left edge 501, a right edge 503 and a center line 505. A viewer 507 located in the left corner close to left edge 501 is looking at the right side of the LCD near the right edge 503. Similarly, a viewer 509 located in the right corner close to right edge 503 is looking at the left side of the LCD near the left edge 501.

In typical circumstances, center 519 of the black matrix 515 may align with center 521 of data line 511. Similarly, center 545 of the black matrix 543 may align with center 547 of data line 535 and center 533 of data line 523 may align with center 531 of black matrix 527. In addition, in typical circumstances the sub pixels 513, 517, 525, 529, 537 and 541 may all have equal widths regardless of their location within the LCD 500. In such circumstances, the color mixing may occur for either of the viewers 507 and 509. For example, a light from backlight 565 may reach the viewer 509 through sub pixel 513 as shown by view path 557. Similarly, viewer 507 may see light from backlight 565 through sub pixel 541 as shown by view path 559. For example, the light from backlight 565 is blocked by the black matrix 527 separating sub pixels 529 and 525. The view paths 561 and 563 are blocked by black matrix 527 and light from backlight 565 does not reach viewers 507 or 509.

In some aspects, in order to prevent the color mixing from occurring, in addition to shifting the black matrices, as previously discussed with respect to FIG. 4, the width of side black matrices 515 and 543 can also be increased to prevent the color mixing from occurring. As shown in FIG. 5, black matrices 515 and 543 are wider than the central black matrix 527. In other aspects, as previously discussed, the width of side sub pixels 513 and 541 can be decreased (shown by arrows 549 and 555) to prevent the color mixing from occurring. As shown in FIG. 5, sub pixels 513 and 541 are narrower than the central sub pixels 525 and 529. In addition, the black matrix 515 can be shifted inwardly towards the center line 505 (shown by arrow 551). Similarly, black matrix 543 can also be shifted inwardly towards the center line 505 (shown by arrow 553). The shifting of the black matrices can block the viewing paths 557 and 559 and prevent light from backlights 565, to reach viewers 507 and 509 located at the edges of the LCD 500 opposite to each data line. In addition to shifting the black matrices, the width of side black matrices 515 and 543 can also be increased to prevent the color mixing from occurring.

Figure 6A:
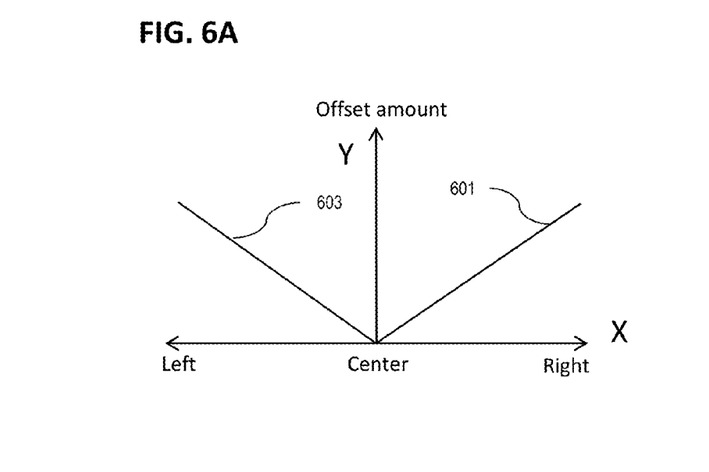
FIGS. 6A-6E are exemplary diagrams of variations in a shift offset of the black matrices, according to various embodiments of the present disclosure.

FIGS. 6A-6E are exemplary diagrams of variations in the amount of shift offset (OS) of the black matrices, according to various embodiments of the present disclosure. In FIGS. 6A-6E, the X axis represents a distance of the pixels from the center line of the LCD panel (e.g., 307 in FIG. 3A), and the Y axis represents an amount of the shift offset (OS) of the black matrix relative to the corresponding data line (e.g., offset OS in FIG. 4). FIG. 6A is a diagram of a linear increase in the shift offset of the black matrices. As shown in FIG. 6A, as the distance X of the black matrix from the center towards the right edge (shown as line 601) or the left edge (shown as line 603) increases, the value Y of the shift offset of the black matrix relative to the corresponding data line increases accordingly. Although FIG. 6A shows that the offset amount at the center is zero, there may be a certain non-zero offset amount in some embodiments.

Figure 6B:
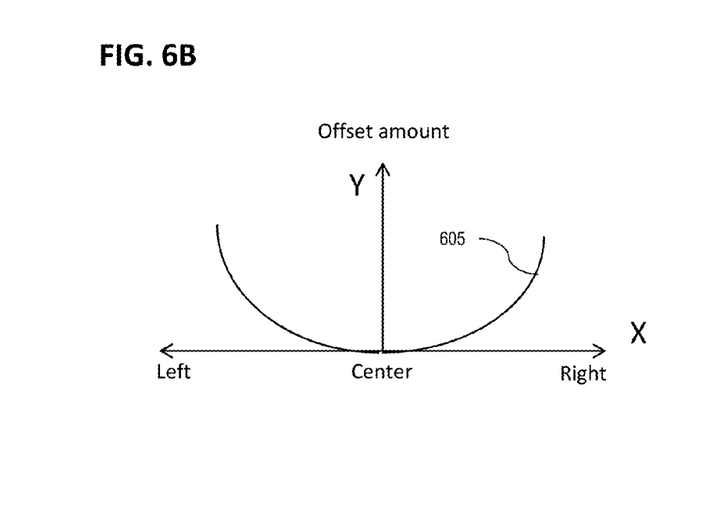

FIG. 6B is a diagram of increase in the shift offset of the black matrices, based on a mathematical equation. For example, as shown in FIG. 6B, the points (x,y) where x is the distance of the black matrix from the center towards the right edge or the left edge and y is the value of the shift offset of the black matrix relative to the corresponding data line may form a non-linear curve 605. In the example of FIG. 6B, the curve 605 has a parabolic shape. However, the equation representing points (x,y) is not limited to a parabolic equation.

Figure 6C:
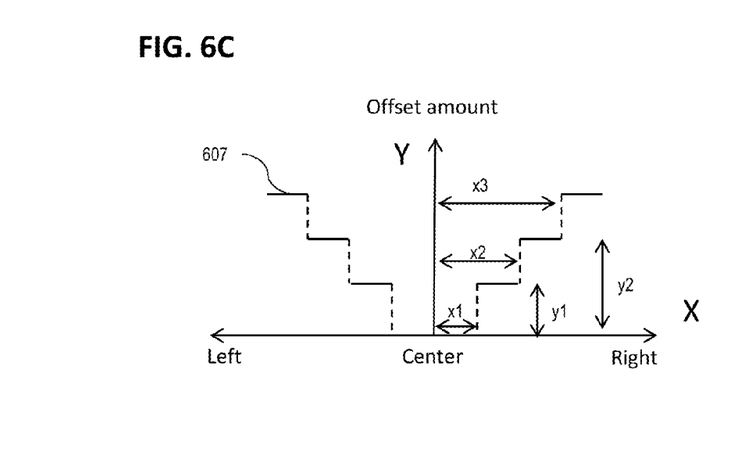

FIG. 6C is a diagram of step-wise increase in the shift offset of the black matrices. For example, as shown in FIG. 6C, the points (x,y) where x is the distance of the black matrix from the center towards the right edge or the left edge and y is the value of the shift offset of the black matrix relative to the corresponding data line may form a step curve 607. In the example of FIG. 6C, for black matrices located within a distance x1 and x2 from the center line towards the right edge or the left edge, the value of the shift offset relative to the data line is y1, while for black matrices located within a distance x2 and x3 from the center line towards the right edge or the left edge, the value of the shift offset is y2.

Figure 6D:
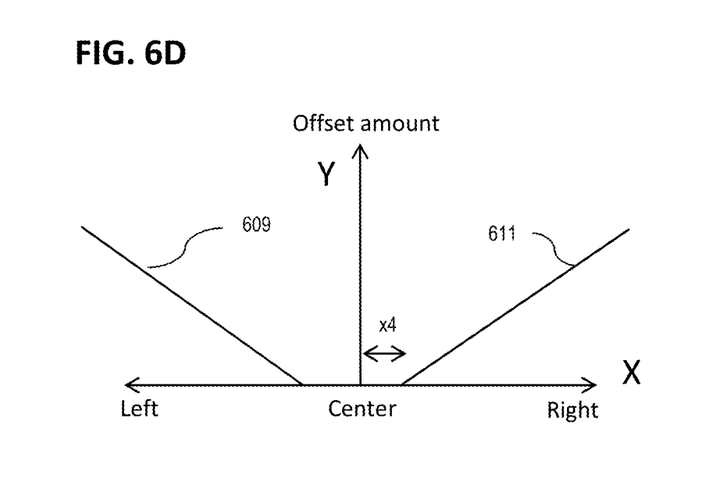

FIG. 6D is a diagram of a linear increase in the shift offset of the black matrices, including an initial value. As shown in FIG. 6D, as the distance X of the black matrix from the center towards the right edge (shown as line 611) or the left edge (shown as line 609) increases, the value Y of the shift offset of the black matrix relative to the corresponding data line increases accordingly. However, for an initial value of x4 the shift value Y is zero. This means that the black matrices within a distance x4 from the center line 307 are not shifted relative to the corresponding data lines and the black matrices' linear shifting starts when a black matrix is located within a distance greater than x4 from the center line 307. Although FIG. 6D shows that the offset amount within distance x4 from the center is zero, there may be a certain non-zero offset amount in some embodiments.

Figure 6E:
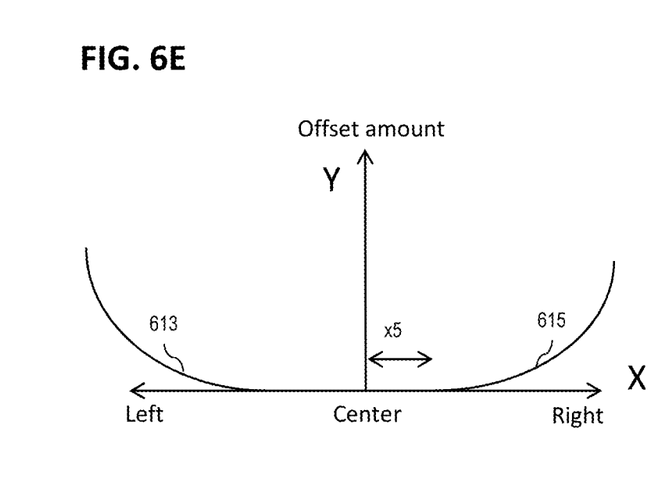

FIG. 6E is a diagram of increase in the shift offset of the black matrices, based on a mathematical equation, including an initial value. For example, as shown in FIG. 6E, the points (x,y) where x is the distance of the black matrix from the center towards the right edge or the left edge and y is the value of the shift offset of the black matrix relative to the corresponding data line may form a non-linear curve 613 or 615. However, for an initial value of x5, the shift value Y is zero. This means that the black matrices within a distance x5 from the center line 307 are not shifted relative to the corresponding data lines and the black matrices' non-linear shifting starts when a black matrix is located within a distance greater than x5 from the center line 307. Although FIG. 6E shows that the offset amount within distance x5 from the center is zero, there may be a certain non-zero offset amount in some embodiments.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A liquid crystal display device comprising:
a display portion having a right edge and a left edge, the display portion being divided into a right side and a left side by a center line, the display portion comprising:
a first substrate comprising a plurality of data lines extending in a first direction and aligned in a second direction intersecting the first direction, each of the plurality of data lines having a center along the first direction;
a second substrate aligned with the first substrate comprising a light blocking film overlapping the plurality of data lines and having a plurality of light blocking portions extending in the first direction and aligned in the second direction, each of the plurality of light blocking portions having a center along the first direction, each of the plurality of light blocking portions overlapping with an associated one of the plurality of data lines in a planar view; and
a liquid crystal layer interposed between the first substrate and the second substrate, wherein:
the plurality of data lines include a first data line and a second data line, the first data line being closer to the center line than the second data line,
the second substrate further comprising a plurality of color filters, the plurality of color filters including at least a first color filter and a second color filter, the first color filter and the second color filter being different color from each other and arranged next to each other in different sub-pixels, wherein each of the plurality of color filters is arranged in a sub-pixel, each sub-pixel is defined by two adjacent data lines and two adjacent gate lines
a plurality of light blocking portions include a first light blocking portion and a second light blocking portion, each of the first light blocking portion and the second light blocking portion being located between the first color filter and the second color filter, and the first light blocking portion overlapping with the first data line and the second light blocking portion overlapping with the second data line, and
a relative distance between the center of the first data line and the center of the first light blocking portion is smaller than a relative distance between the center of the second data line and the center of the second light blocking portion.

2. The liquid crystal display device of claim 1, wherein the relative distance increases step-wise based on a distance range of the data line from the right edge or from the left edge.

3. The liquid crystal display device of claim 1, wherein the relative distance increases non-linearly based on a distance range of the data line from the right edge or from the left edge.

4. The liquid crystal display device of claim 1, wherein the light blocking portion is shifted toward the center line with respect to the associated data line when the location becomes farther from the center line and closer to the left edge or the right edge.

5. The liquid crystal display device of claim 1, wherein the first direction is parallel to the center line and the second direction is perpendicular to the center line.

6. The liquid crystal display device of claim 1, wherein a width of the associated light blocking portion is equal to a width of other light blocking portions from the plurality of light blocking portions.

7. The liquid crystal display device of claim 1, wherein the first light blocking portion is smaller than the second light blocking portion.

8. The liquid crystal display device of claim 1, wherein a width of the associated light blocking portion increases when the location becomes farther from the center line and closer to the left edge or the right edge.

9. A liquid crystal display device comprising:
a display portion having a right edge and a left edge, the display portion being divided into a right side and a left side by a center line, the display portion comprising:
a first substrate comprising a plurality of data lines extending in a first direction and aligned in a second direction intersecting the first direction;
a second substrate aligned with the first substrate comprising a light blocking film overlapping the plurality of data lines and having a plurality of light blocking portions extending in the first direction and aligned in the second direction, each of the plurality of light blocking portions overlapping with an associated one of the plurality of data lines in a planar view; and
a liquid crystal layer interposed between the first substrate and the second substrate, wherein:
a width of a light blocking portion associated with a data line is determined based on a location of the data line.

10. The liquid crystal display device of claim 9, wherein the width increases when the location becomes farther from the center line and closer to the left edge or the right edge.

11. The liquid crystal display device of claim 9, wherein each of the plurality of data lines has a center along the first direction, and each of the plurality of light blocking portions has a center along the first direction, and wherein a relative distance between the center of a data line and the center of an associated light blocking portion is determined based on a location of the data line.

12. The liquid crystal display device of claim 11, wherein the relative distance increases when the location becomes farther from the center line and closer to the left edge or the right edge.

13. The liquid crystal display device of claim 12, wherein the light blocking portion is shifted toward the center line with respect to the associated data line when the location becomes farther from the center line and closer to the left edge or the right edge.

14. The liquid crystal display device of claim 9, wherein the first direction is parallel to the center line and the second direction is perpendicular to the center line.

15. The liquid crystal display device of claim 9, wherein the width of the light blocking portion increases by 10% to 40% when the location becomes father from the center line and closer to the left edge or the right edge.

* * * * *